US010061501B2

United States Patent
Ullrich et al.

(10) Patent No.: US 10,061,501 B2
(45) Date of Patent: Aug. 28, 2018

(54) USER INTERFACE FOR CO-OPTIMIZING WEIGHT FACTORS

(71) Applicants: Oliver Ullrich, Miami Beach, FL (US); Naphtali David Rishe, Miami Beach, FL (US); Daniel Luckerath, Cologne (DE)

(72) Inventors: Oliver Ullrich, Miami Beach, FL (US); Naphtali David Rishe, Miami Beach, FL (US); Daniel Luckerath, Cologne (DE)

(73) Assignee: The Florida International University Board of Trustees, Miami, FL (US)

( * ) Notice: Subject to any disclaimer, the term of this patent is extended or adjusted under 35 U.S.C. 154(b) by 363 days.

(21) Appl. No.: 14/877,379

(22) Filed: Oct. 7, 2015

(65) Prior Publication Data

US 2017/0102860 A1    Apr. 13, 2017

(51) Int. Cl.
*G06F 3/048* (2013.01)
*G06F 3/0484* (2013.01)
*G06F 3/0488* (2013.01)
*G06F 17/30* (2006.01)

(52) U.S. Cl.
CPC ........ *G06F 3/04847* (2013.01); *G06F 3/0488* (2013.01); *G06F 3/04842* (2013.01); *G06F 17/30572* (2013.01)

(58) Field of Classification Search
CPC ............................ G06F 3/0482; G06F 3/04847
USPC .......................................................... 715/771
See application file for complete search history.

(56) References Cited

U.S. PATENT DOCUMENTS

| 5,844,572 A * | 12/1998 | Schott ................... G06F 3/0481 345/440 |
| 2004/0222987 A1* | 11/2004 | Chang ................ G01B 11/2509 345/419 |
| 2005/0068320 A1* | 3/2005 | Jaeger ................... G06T 11/206 345/440 |
| 2009/0164948 A1* | 6/2009 | Kramer ............. G06F 17/30398 715/856 |

\* cited by examiner

*Primary Examiner* — William Titcomb
(74) *Attorney, Agent, or Firm* — Saliwanchik, Lloyd & Eisenschenk (57) ABSTRACT

Techniques and systems are disclosed for receiving user input related to three co-optimized objectives, factors, or parameters, and translating the user input into weight factors for a tri-variable weighting function. In various embodiments, a triangular user interface element is displayed that allows a user to assign importance weights to three interrelated decision optimization objectives using a single user input selection gesture. Each side of the triangular user interface element presents a factor of the weight function. When the user selects a single position on the perimeter or within the field of the triangular figure in the user interface, weight factors for each of the three interrelated optimization objectives are determined that can be used as weight factors in the tri-variable weighting function.

13 Claims, 7 Drawing Sheets

100 Display a triangular figure within a graphical user interface on a display, wherein a first side of the triangular figure represents a first range of a first factor, a second side of the triangular figure represents a second range of a second factor, and a third side of the triangular figure represents a third range of a third factor, wherein a vertex of the triangular figure represents a lowest value of one factor and a highest value of another factor 110 Receive an indication, from the graphical user interface, of a selected position on a side or within the field of the triangular figure 120 Determine, from the selected position with respect to three vertices of the triangular figure, a first weight factor, a second weight factor, and a third weight factor of a tri-variable weight function

USER INTERFACE FOR CO-OPTIMIZING WEIGHT FACTORS

GOVERNMENT SUPPORT

This invention was made with government support under grant numbers IIP-1338922, IIP-1237818, IIP-1330943, IIS-1213026, and CNS-1532061, awarded by the National Science Foundation. The government has certain rights in the invention.

BACKGROUND

Almost every day, more and more aspects of human life become automated or computer-assisted. For example, applications that recommend parking places, restaurants, and driving directions are now widely available. Such applications have become possible because of the wider availability of diverse, interchangeable data sources, such as real-time traffic data and rating data from diners at restaurants.

With vast amounts of such data available at their disposal, decision systems have become more prevalent that help fully or partially automate the selection of many routine options that individual once made themselves. For example, rather than an individual having to decide the best of many possible ways to get from point A to point B, driving direction applications can now calculate several best routes from travel times and distances determined from real-time traffic data.

However, user input as to which of several competing criteria to optimize is often still needed by these decision systems. In a driving direction application, for example, factors such as a user's preference for low toll costs, for short distances over time, a preference for highways over side streets, etc., can make a vast difference in a selected driving route even when perfect information about traffic conditions is available. Furthermore, a user's preference as to which criteria to optimize often varies on a case-by-case basis; therefore, the need for user input may not be minimized even in a decision system that includes machine-learning techniques.

Therefore, easy-to-use and intuitive techniques and systems for allowing a diversity of decision systems to gather a user's input regarding their objectives are needed.

BRIEF SUMMARY

Techniques and systems are disclosed for receiving user input related to three co-optimized objectives, factors, or parameters, and translating the user input into weight factors for a tri-variable weighting function.

In various embodiments, a triangular user interface element is displayed that allows a user to assign importance weights to three interrelated decision optimization objectives using a single user input selection gesture. Each side of the triangular user interface element presents a factor of the weight function. When the user selects a single position on the perimeter or within the field of the triangular figure in the user interface, weight factors for each of the three interrelated optimization objectives are determined that can be used as weight factors in the tri-variable weighting function.

The relative positioning of the three factors is determined by the construction of the triangular figure such that the relationship between the three optimization objectives falls with reference to vertices of the triangular figure.

Some embodiments include a feedback interface element which indicates relative weight values of the weight factors associated with the selected position.

Various system environments may implement the described techniques and systems, for example, an application requiring input from the user for optimizing decision-making. Such an application may be implemented on a smartphone, tablet, mobile device, or other computing device. Furthermore, capabilities for presenting a triangular user interface element (and an associated feedback element) may be provided as part of a component library or application programming interface (API) that is employed by such applications.

Advantageously, embodiments of the subject invention enable a user to make a single selection to establish weight factors for all three optimization objectives. An interface allowing single selection of multiple weight factors provides improved usability for the user of the interface. For example, it may be difficult for a user to mentally grasp the relative relationship of several weight factors in a standard interface where each weight factor is chosen independently. Embodiments provide an interface in which proportionality of the relative importance of the three weight factors is maintained. This may result in enhanced reliability and reduced error rate among factor weighting inputs, as well as a reduced error rate in systems utilizing the weighting inputs for other determinations. Further, embodiments may advantageously enhance GUI performance by requiring less space on the GUI screen than, for example, a more traditional weight-input interface that includes three separate weight factor input elements. An interface element that uses less GUI screen space may allow weight factor inputs to be selected in device form factors that have less overall GUI screen space, e.g., mobile devices and wearables like smartwatches. Furthermore, simplified user interface inputs often result in lower susceptibility to software errors and "bugs" because fewer user input validation checks are required.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Techniques and systems are disclosed for receiving user input related to three co-optimized objectives, factors, or parameters, and translating the user input into weight factors for a tri-variable weighting function.

In various embodiments, a triangular user interface element is displayed that allows a user to assign importance weights to three interrelated decision optimization objectives using a single user input selection gesture. Each side of the triangular user interface element presents a factor of the weight function. When the user selects a single position on the perimeter or within the field of the triangular figure in the user interface, weight factors for each of the three interrelated optimization objectives are determined that can be used as weight factors in the tri-variable weighting function.

The relative positioning of the three factors is determined by the construction of the triangular figure such that the relationship between the three optimization objectives falls with reference to vertices of the triangular figure.

Figure 1:
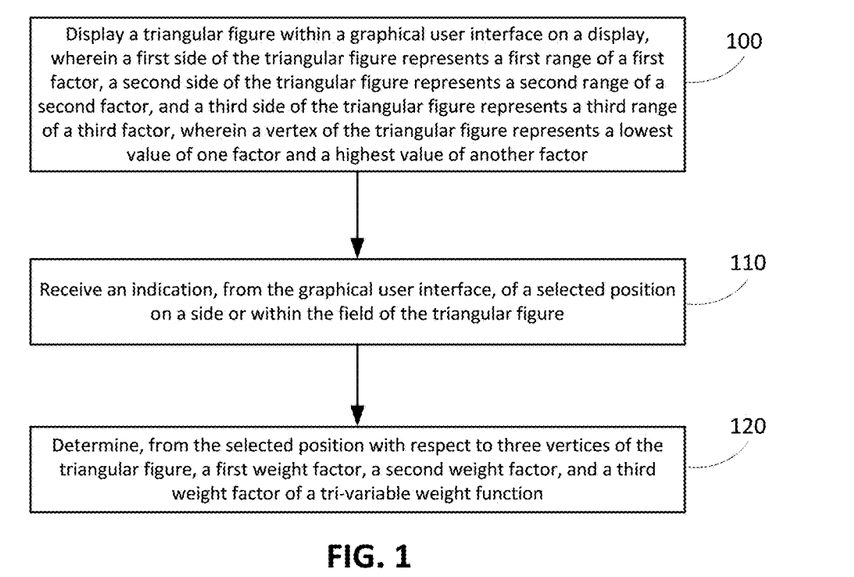
FIG. 1 shows an example process flow for receiving and interpreting user input for establishing weight factor values for a tri-variable weight function.

FIG. 1 shows an example process flow for receiving and interpreting user input for establishing weight factor values for a tri-variable weighting function. The user input may be used, e.g., to determine the relative importance (to the user) of several factors that are relevant to optimizing a computer-aided decision-making function. Descriptions of the example process flow may reference other figures to enhance the clarity of the explanation.

A process flow for receiving the user input initiates with the display of a triangular user interface element (also known as a "triangular figure") within a graphical user interface (100). The triangular figure is arranged such that the first side of the triangular figure represents the first range of the first factor for decision-making, the second side of the triangular figure represents the second range of the second factor, and the third side of the triangular figure represents the third range of the third factor (100). In certain embodiments, the factors are being co-optimized, meaning that the factors are in tension with one another so that assigning a higher value to one factor generally lowers the values of one or both of the other factors. Thus, in this embodiment, any given vertex of the triangular figure represents a lowest range value of one factor and a highest range value of another factor (100).

Figure 2A:
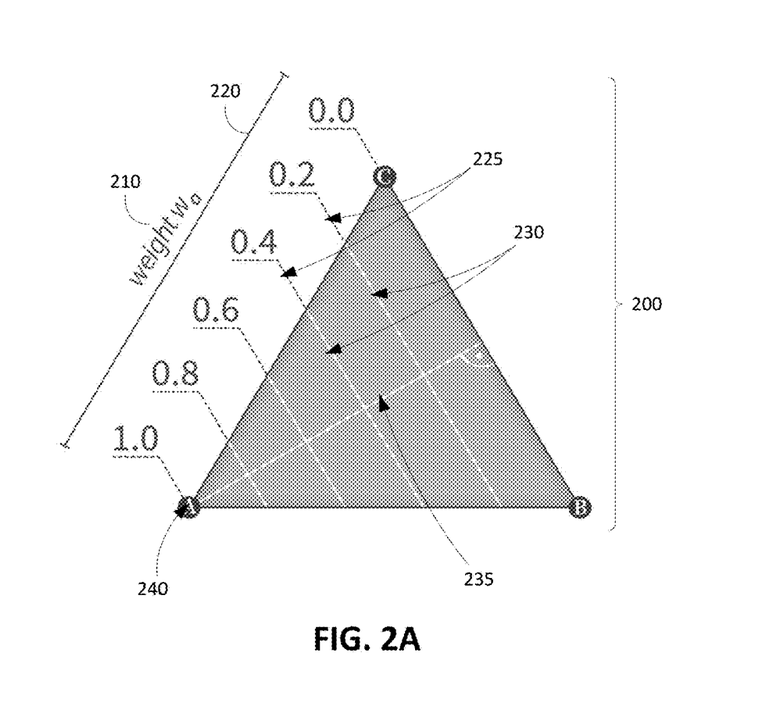
FIG. 2A shows an example representation of a triangular user interface element with a single factor drawn for clarity.
Figure 2B:
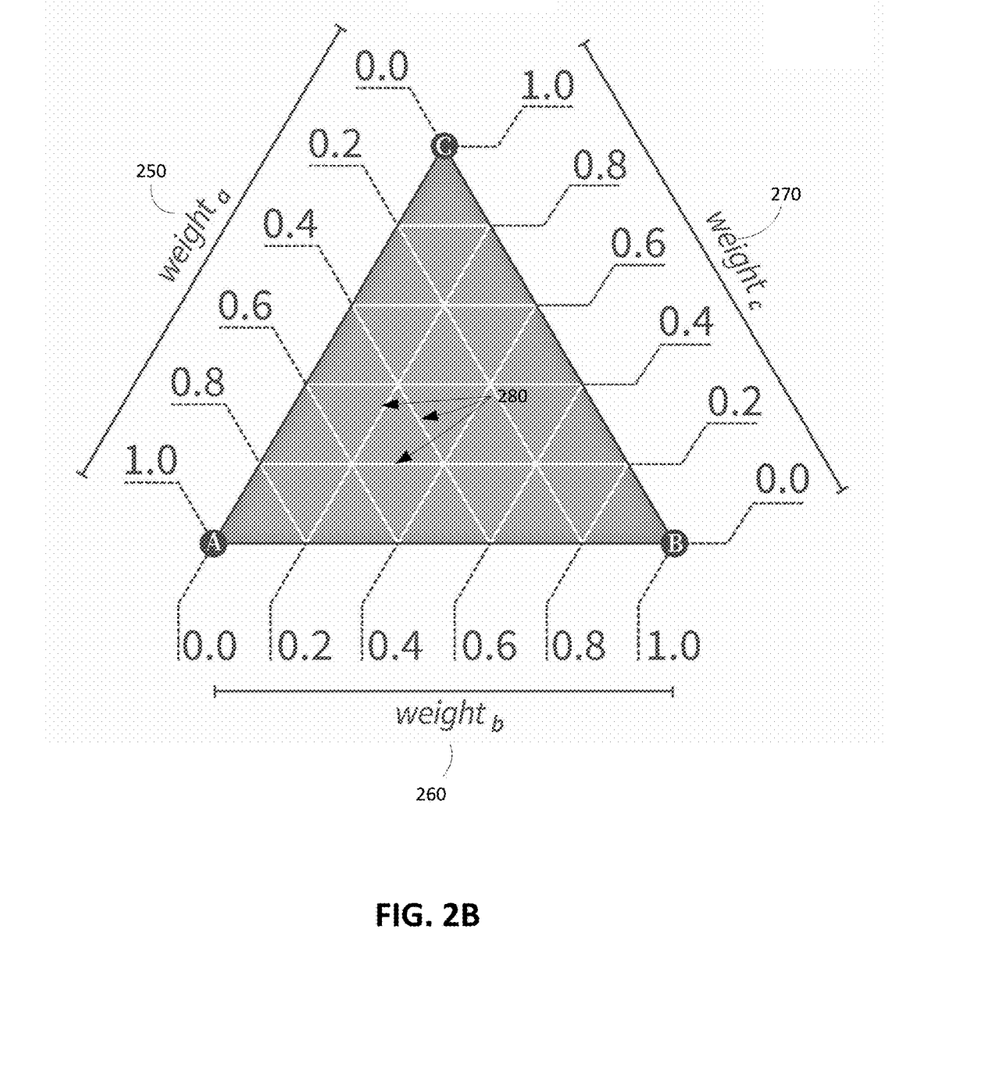
FIG. 2B shows an example representation of a triangular user interface element with all three factors shown.

FIGS. 2A and 2B clarify the relationship of the factors and ranges to the visual characteristics of the triangular interface figure.

FIG. 2A shows an example representation of a triangular user interface element with a single factor drawn for clarity. One side of the triangular user interface element 200 depicts a factor $W_a$ 210. Associated with the factor $W_a$ 210 is a simple linear scale showing a range of values (e.g., 220) associated with the $W_a$ 210. Markers on the linear scale (e.g., 225) may be used to establish intersection locations on the weighting side $W_a$ with demarcation lines (e.g., 230). The demarcation lines 230 are drawn perpendicular to the altitude line 235 from the vertex 240 representing with the top end of the range of factor $W_a$.

Following from the single factor example of FIG. 2A, FIG. 2B shows an example representation of a triangular user interface element with all three factors shown. Each side of the triangular user interface element depicts a factor (e.g., $W_a$, $W_b$, and $W_c$). Associated with each factor (250, 260, 270) is a linear scale showing weight values. In this example, the linear scale of each factor is divided into 0.2 unit increments marked on each factor. For illustrative purposes, demarcation lines (e.g., 280; not all demarcation lines are marked) are drawn from each increment mark that intersects an altitude line (not shown) at a perpendicular angle.

In some embodiments, one or more range demarcation lines may be rendered visibly on the graphical user interface to provide visual cues to a user of the triangular interface element. In some cases, range labels may be rendered in association with the range demarcation lines.

It should be noted that no particular arrangement of factors is suggested or implied by these example figures. In varying embodiments, implementations, or uses, factor range scales may, or may not, be rendered or visible to a user of the triangular user interface element. Also, in varying embodiments, implementations, or uses, demarcation lines may, or may not, be rendered or shown to a user. Furthermore, representations of the factor ranges in any figure (e.g., as ranging from "0.0" to "1.0") are exemplary only. For example, the ranges of the factors may represent, for example, numerical scales (e.g., "rate from 1 to 100") or textual scales (e.g., "more important to less important"), rather than weight values. The numerical or textual scales may be used to present visual cues to the user of the triangular interface element that make the most sense in a given usage context. As described with respect to techniques and systems of the subject invention, weight factors may be determined from characteristics of the user's selected position in the field or on the border of the triangular user interface element, and not necessarily from values ascribed to the implied or labeled ranges of the factors.

Figure 3A:
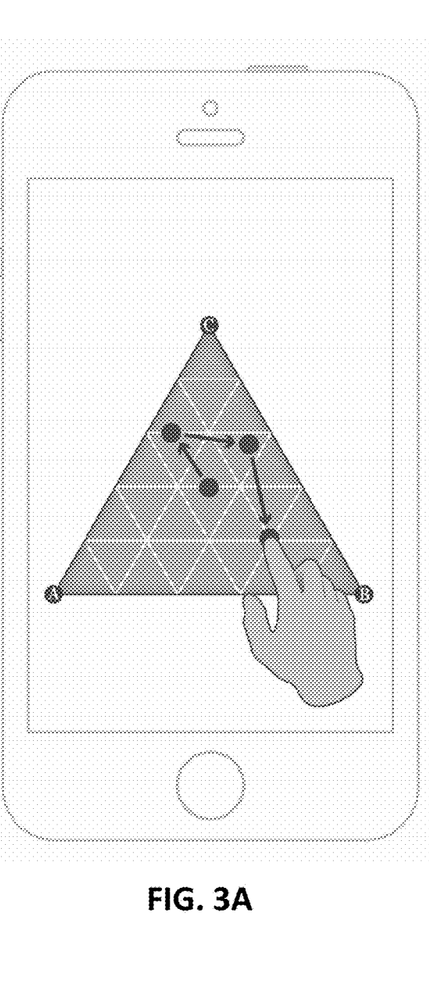
FIG. 3A shows an example representation of a triangular user interface element rendered on the graphical user interface of a mobile device.

Returning now to FIG. 1, a user may make an indication on the graphical user interface of a selected position on a side or within the field of the triangular figure (110). FIG. 3A shows an example representation of a triangular user interface element rendered on the graphical user interface of a mobile device. The hand of a user is depicted as the user moves around to several locations on the triangular figure.

Figure 3B:
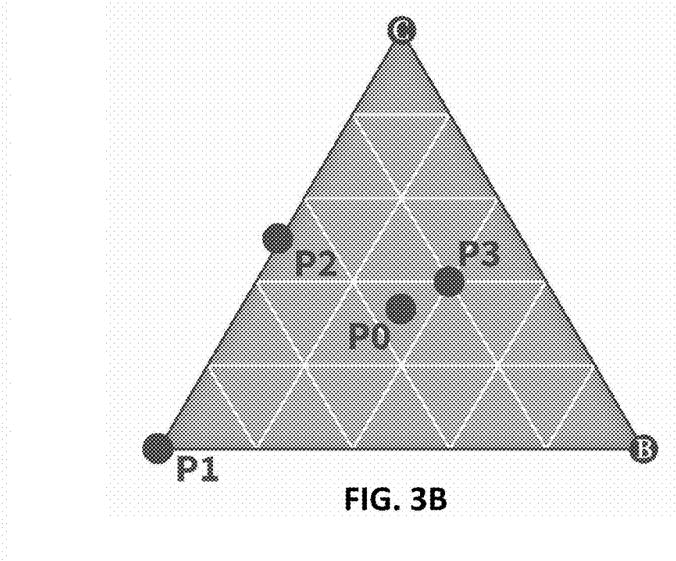
FIG. 3B shows an example representation of a triangular user interface element with several selected positions.

Returning again to FIG. 1, from the selected position with respect to the three vertices of the triangular figure, the first weight factor, second weight factor, and third weight factors of the tri-variable weight function can be determined (120). FIG. 3B shows an example representation of a triangular user interface element with several selected positions. Selected positions P0, P1, P2, and P3 indicate different positions that a user might indicate on the triangular user interface element, e.g., by contacting a touchscreen display with a finger. The linear scale has been removed for clarity of the figure. However, assuming the same linear scale as in FIG. 2B, the values of the three weight factors can be determined respective to the selected position. For example, if a user moves the indicator to selected position P0, the triangular figure's orthocenter, the three weight factors are determined to be $W_a=W_b=W_c=0.3333\ldots$; Selected position P1 indicates weight factors of $W_a=1$ and $W_b=W_c=0$; Selected position P2 indicates weight factors of $W_a=W_c=0.5$ and $W_b=0$; and selected position P3 indicates weight factors of $W_a=0.2$, and $W_b=W_c=0.4$.

In some embodiments, determination of the weight factors from the selected position with respect to the three vertices of the triangular figure can be performed by determining the relative distance of the selected position from each of the vertices.

Figure 4:
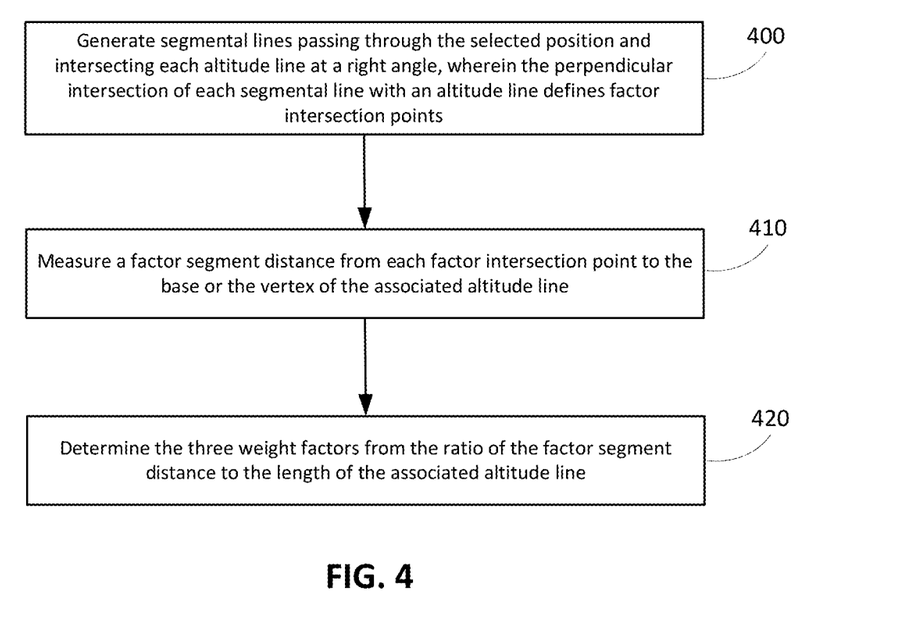
FIG. 4 shows an example process flow that may be used in some embodiments for determining weight factors from the selected position with respect to the three vertices of the triangular figure.

FIG. 4 shows an example process flow that may be used in some embodiments for determining weight factors from the selected position with respect to the three vertices of the triangular figure. The process flow of FIG. 4 may be performed, for example, by an application, API, or component of a device or system as described in FIG. 8.

Generally, the process flow of FIG. 4 describes generating an altitude line from each vertex of the triangular figure and generating a segmental line that passes through the selected position and intersects each of the altitude lines perpendicularly. Since each vertex of the triangular figure represents the top range of a factor, the intersection point of each segmental line with each altitude line defines a segment distance from the top range of the factor associated with the vertex/altitude line. The ratio of this segment distance to the overall length of the associated altitude line may be used to determine the value of the weight factor for that factor.

Initially, segmental lines passing through the selected position and intersecting each altitude line at a right angle are generated, wherein the perpendicular intersection of a segmental line with an altitude line defines factor intersection points (400). It should be noted that segmental lines and altitude lines may, or may not, be aspects of the triangular user interface element that are visible to a user interacting with the user interface.

Distances can then be measured from each factor intersection point to the base or the vertex of the associated altitude line; these distances determine three "factor segment distances" (410). The factor segment distances may be measured either from the base of the altitude line to the factor intersection point or from the vertex of the altitude line to the factor intersection point.

Values for the three weight factors can then be determined from the ratio of the factor segment distance to the length of the associated altitude line (420). Either factor segment distance (to the vertex or to the base of the altitude line) is usable, as either will define a ratio of the overall length of the altitude line. For instance, if the factor segment distance defines the distance from the base, then the ratio is the weight factor; or, if the factor segment distance defines the distance from the vertex, the weight factor is determined by subtracting the ratio from 1.

Figure 5:
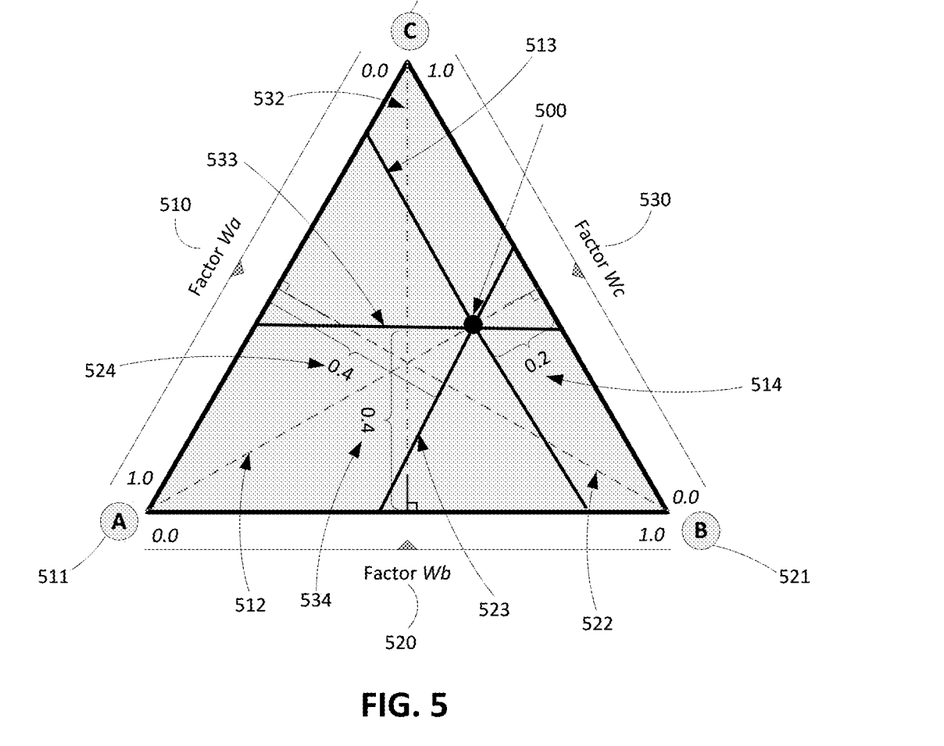
FIG. 5 shows an example of a triangular user interface element showing aspects related to techniques for determining a tri-variable weight function in some embodiments.

FIG. 5 can be used as a visual aid for understanding the process flow of FIG. 4. FIG. 5 shows an example of a triangular user interface element showing aspects related to techniques for determining a tri-variable weight function in some embodiments. In FIG. 5, certain visual aspects are depicted that may, or may not, be shown in an implementation of the triangular user interface element on a given GUI. FIG. 5 shows an example of a selected position 500 on the triangular user interface element that is used to indicate the values of a first, second, and third weight factor.

The first factor range is shown as element 510. Vertex A (511) indicates the maximum of the first factor range. An altitude line 512 extends from vertex A (511) to its base at the opposing side of the triangle. For simplicity, all the factor ranges are shown as scalar values ranging from 0.0-1.0.

Determining the first weight factor value from the selected position may be performed, in some embodiments, by extending a first factor segmental line 513 through the selected position and intersecting the first factor altitude line 512 at a right angle. The point at which the first factor segmental line 513 intersects the first factor altitude line 512 demarks a line segment 514 on the altitude line 512. This line segment 514 can be measured and used to determine a value for the first weight factor. In the example of FIG. 5, showing a linear scale, line segment 514 is measured as, e.g., 0.2 units, or ⅕ of the distance up from the base of the altitude line. Therefore, the first weight factor value is determined to be 0.2.

Alternatively, a complementary segment from the vertex to the intersection point of the segmental line on the altitude may be measured. If the vertex represents the maximum of the factor range, then the complementary segment measurement denotes the unselected ratio and thus can be subtracted from the overall measurement to derive the weight factor value (e.g., 5/5 minus 4/5=1/5).

Similarly, the second factor range is shown as element 520. Vertex B (521) indicates the maximum of the second factor range 520. A second factor altitude line 522 extends from vertex B (521) to its base at the opposing side of the triangle. Determining the second weight factor value from the selected position may be performed, in some embodiments, by extending a second factor segmental line 523 through the selected position and intersecting the second factor altitude line 522 at a right angle. The point at which the second factor segmental line 523 intersects the second factor altitude line 522 demarks a line segment 524 on the altitude line 522. This line segment 524 can be measured and used to determine a value for the second weight factor. In the example of FIG. 5, showing a linear scale, line segment 524 is measured as, e.g., 0.4 units, or ⅖ of the distance up from the base of the altitude line. Therefore, the second weight factor value is determined to be 0.4.

The third factor range is shown as element 530, and Vertex C (531) indicates the maximum of the third factor range. The third weight factor can be determined similarly to the first and second weight factors using third factor altitude line 532, third factor segmental line 533, and line segment 534.

It should be noted that techniques, other than those described in FIG. 5, for determining weight factors from a selected position may be suggested to a practitioner in the art.

Figure 6:
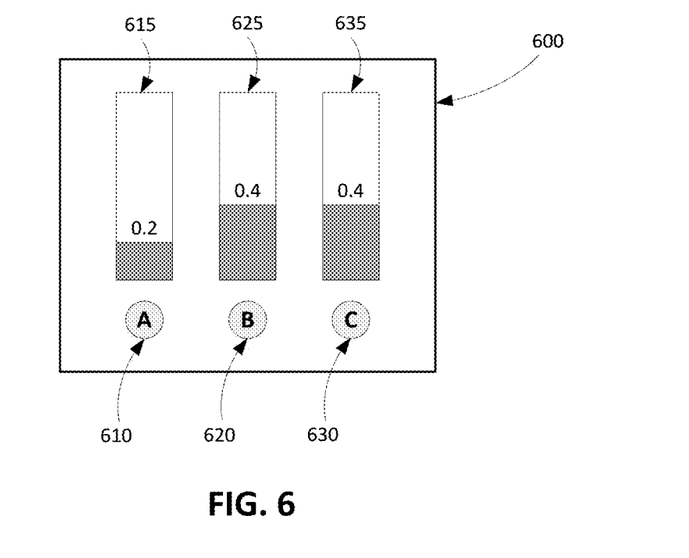
FIG. 6 shows an example of a feedback interface element that may be present in some embodiments of the subject invention.

FIG. 6 shows an example of a feedback interface element that may be present in some embodiments of the subject invention. A feedback interface element, which may be present in some implementations, can provide feedback to a user about how the currently selected position indicated on the triangular user interface element impacts the values of the first, second, and third weight factors. In FIG. 6, a feedback interface element depicting the relative levels of the weight factors over their range is shown.

If, for example, the selected position on the triangular user interface element is shown as in FIG. 5, feedback interface element 600 may reflect the values as shown in FIG. 6. Factor "A" 610 shows level indicator 615, depicting that the selected position is 0.2 of the range between 0.0 and 1.0 for this factor. Likewise, factor "B" 620 has a related level indicator 625, and factor "C" 630 has a related level indicator 635. In some cases, text associated with a factor's range value or weight factor (e.g., "0.2", "0.4") may be shown.

A change in the selected position, as might occur, for example, when a user of a touch screen device moves a finger to a different location on the triangular interface element associated with the feedback interface element, would cause a change in the position of the levels in one or more of the level indicators 615, 625, and 635.

Certain example scenarios may be illuminative of embodiments of the subject invention described herein.

These scenarios may illustrate procedures for practicing certain disclosed techniques and/or implementing disclosed systems. The example scenarios may also illustrate advantages, including technical effects, of the disclosed techniques and systems. These examples should not be construed as limiting.

Figure 7:
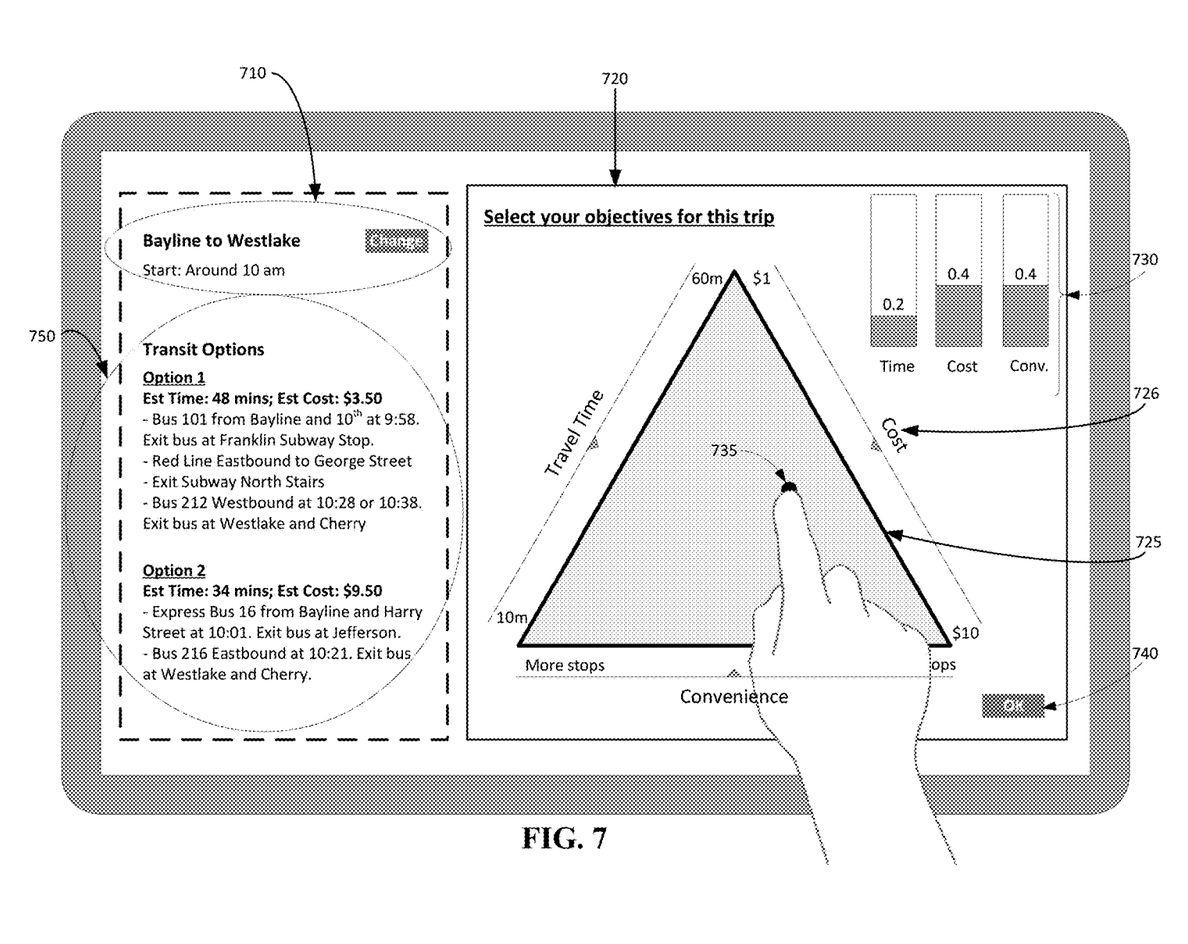
FIG. 7 shows an example triangular user interface element embodied in a system environment for optimizing transit option recommendations.

An example scenario is described with respect to FIG. 7, which shows an example triangular user interface element embodied in a system environment for optimizing transit option recommendations. In the example scenario, a mobile "app" (e.g., on a tablet or smartphone) is shown that facilitates multimodal wayfinding using a transit system; trips may consist of several legs, each with a multitude of options.

For example, the user can indicate beginning and destination locations and the trip's desired start or end time using interface element 710. However, to provide an optimized trip experience, the wayfinding app may benefit from further data on the user's preferences for balancing potentially competing parameters such as cost, travel time, and convenience.

The wayfinding mobile app presents the user with interface element 720 having figures such as those described in embodiments of the subject invention. Here, element 720 has triangular user interface element 725 specific to the cost, travel time, and convenience factors, as well as a feedback interface element 730 for providing weight factor relationship feedback to the user. In this example, the triangular user interface element 725 has factor ranges that are presented in units that may be more understandable to a transit system user than weight factors (e.g., cost range 726, from $1-$10).

As the user indicates a selected position 735, e.g., by moving a finger on the touchscreen of the tablet device, the weighting factors for cost, travel time, and convenience are adjusted. Feedback user interface element 730 shows the relative importance of the weighting factors to the user based on the selection position 735, including text labels showing each factor's individual weight of a total weight of 1.0. The relative weighting of factors in the feedback interface element 730 may dynamically adjust, e.g., as the user drags his or her finger around on the touchscreen interface.

In some embodiments, when the user has indicated a final selected position, an interface element such as an "OK" button 740 may be used to close the trip objective interface 720. The weight factors (e.g., $W_{TravelTime}=0.2$, and $W_{Convenience}=W_{Cost}=0.4$) may be returned to an algorithm within the wayfinding app that is then applied to adjust the trip routing options 750 based on these co-optimized weights.

In some cases, e.g., the transit app shown in the figure, the transit options 750 may dynamically adjust and/or reorder in response to the user dragging his or her finger around on the triangular user interface element 725 of the touchscreen interface.

Another use scenario is a "parking recommendation" application on a smartphone. Using the application, the user indicates her destination, e.g. a major shopping mall, on a map. Since there may be several parking lots near the destination, the application may provide more useful recommendations by establishing the user's preferences with respect to several factors. It presents the user with an embodiment of the triangular user interface element having co-optimization factors of cost, convenience, and availability.

In this example, since the user does not want to take any chances and thus wants to make sure that parking is really available, and also prefers a relatively high convenience out of fear of rain, she indicates weight factors of $W_{cost}=0.1$, $W_{convenience}=0.4$ and $W_{availability}=0.5$ by interacting with the triangular user interface element as described in embodiments herein. The application uses these co-optimized weights as inputs for an algorithm which recommends the user to park in a designated area of a designated parking lot.

Various system environments may implement the described techniques and systems. For instance, a user interface in an application, or "app," may be generated on a local computer or on a smartphone. The user interface, or one or more aspects thereof, may also be generated from a local or remote web server and sent to a client device, and the user interface presented via a web browser. The user interface, or one or more aspects thereof, may be generated as part of a cloud service and rendered locally; such a cloud service may be integrated with other services, such as social networking services and information management services.

In some embodiments, capabilities for presenting a triangular user interface element (and an associated feedback element) may be provided as part of a component library, such as an application programming interface (API). An API is generally a set of programming instructions and standards for enabling two or more applications to communicate with each other. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media. An API is commonly implemented as a set of Hypertext Transfer Protocol (HTTP) request messages and a specified format or structure for response messages according to a REST (Representational state transfer) or SOAP (Simple Object Access Protocol) architecture.

In some cases, the API may receive a description or definition of the factors, which may include labels for the factors and ranges, from an application. The API, which may be implemented, e.g., by a local component library or a cloud service, can receive the definition of the factors and ranges, draw the triangular user interface element in accordance with the definition, determine the weight factors from the user's selected position, as described, and return the distinct weight factors to the application. The application can then use the weight factors as desired in its own decision-making or option-presenting functions or interfaces.

The API for receiving user input for a tri-variable weight function can be part of a library of such capabilities. For example, a triangular user interface element may be provided as part of a user interface widget library, such as might be available in an application development framework (e.g., Microsoft .NET®) or integrated development environment (e.g., Visual Studio® from Microsoft, Android Studio from Google®).

Receiving a user indication of a selected position can occur variously depending on different device embodiments. In certain embodiments, a touchscreen, such as that found on a mobile device, smartphone, tablet, or laptop touchscreen, may detect user input of the selected position by the placement of the user's finger (or other digit) on the touchscreen.

In some embodiments, e.g., a more traditional computing device, the selected position may be provided by user interaction with a mouse.

Other device embodiments can include, for example, an eye-tracking display. For instance, if the user utilizes a device which is capable of detecting eye movements, the device might detect that the user's eye gestures toward or lingers on a position on the triangular user interface element, indicating the user's interest in selecting that position. Other devices capable of presenting a triangular user interface element, e.g., a smart watch or other wearable, are envisioned.

Figure 8:
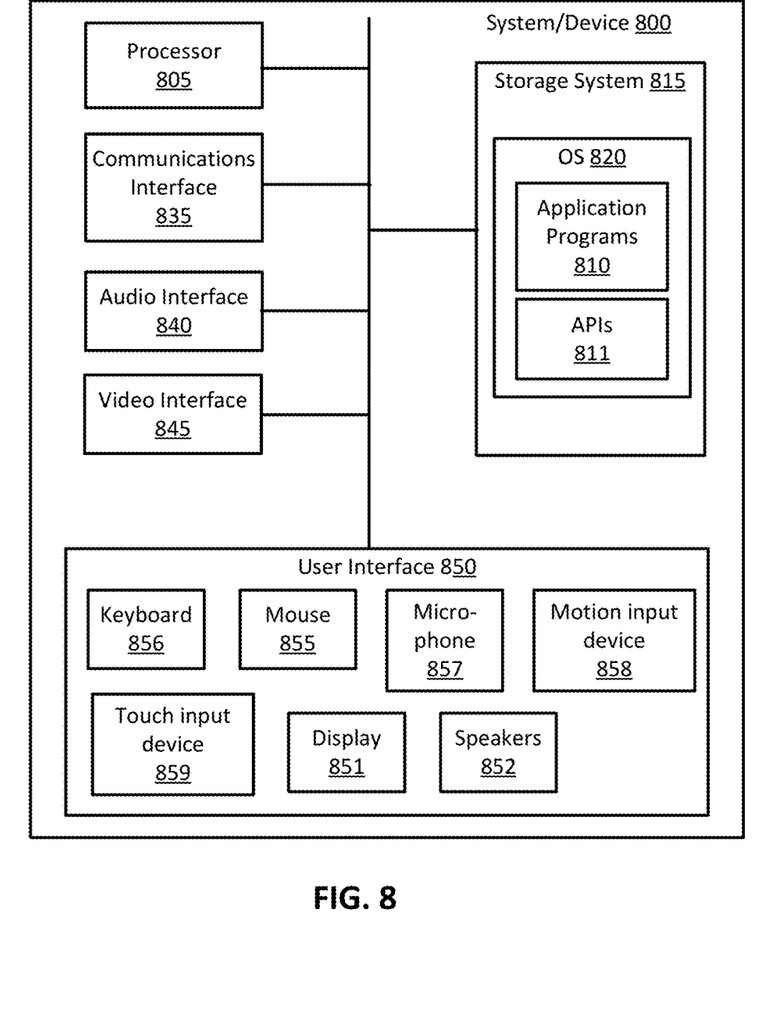
FIG. 8 shows a block diagram illustrating components of a computing device used in some embodiments.

FIG. 8 shows a block diagram illustrating components of a computing device used in some embodiments. System 800 may be implemented within a single computing device or distributed across multiple computing devices or sub-systems that cooperate in executing program instructions. System 800 can be used to implement myriad computing devices, including but not limited to a personal computer, a tablet computer, a reader, a mobile device, a personal digital assistant, a smartphone, a laptop computer, a gaming device or console, a desktop computer, a wearable device, a smartwatch, or a smart television. Accordingly, more or fewer elements than those described with respect to system 800 may be incorporated to implement a particular computing device.

System 800, for example, includes a processor 805 which processes data according to the instructions of one or more application programs 810 and/or APIs 811 interacting with the device operating system (OS) 820. Examples of the processor 805 include general purpose central processing units, application specific processors, and logic devices, as well as any other type of processing device, combinations, or variations thereof. Processors may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

The application programs 810, APIs 811, OS 820 and other software may be loaded into and stored in a storage system 815. Device operating systems 820 generally control and coordinate the functions of the various components in the computing device, providing an easier way for applications to connect with lower level interfaces like the networking interface. Non-limiting examples of operating systems include Windows® from Microsoft Corp., IOS™ from Apple, Inc., Android™ OS from Google, Inc., and the Ubuntu variety of the Linux OS from Canonical. It should be noted that the OS 820 may be implemented both natively on the computing device and on software virtualization layers running atop the native Device OS. Virtualized OS layers, while not depicted in FIG. 8, can be thought of as additional, nested groupings within the OS 820 space, each containing an OS, application programs, and APIs.

Storage system 815 may comprise any computer readable storage media readable by the processor 805 and capable of storing software (e.g., application programs 810, APIs 811, and OS 820).

Storage system 815 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory, propagated signal. In addition to storage media, in some implementations storage system 815 may also include communication media over which software may be communicated internally or externally. Storage system 815 may be implemented as a single storage device but may also be implemented across multiple storage devices or sub-systems co-located or distributed relative to each other. Storage system 815 may comprise additional elements capable of communicating with processor 805.

Software may be implemented in program instructions and among other functions may, when executed by system 800 in general or processor 805 in particular, direct system 800 or processor 805 to operate as described herein for receiving and interpreting user input for weight factor values for a tri-variable weight function (e.g., process flow as in FIG. 1). Software may include additional processes, programs, or components, such as operating system software or other application software. Software may also comprise firmware or some other form of machine-readable processing instructions executable by processor 805.

In general, software may, when loaded into processor 805 and executed, transform computing system 800 overall from a general-purpose computing system into a special-purpose computing system customized to facilitate receiving and interpreting user input for establishing weight factor values for a tri-variable weight function as described herein for each implementation. Indeed, encoding software on storage system 815 may transform the physical structure of storage system 815. The specific transformation of the physical structure may depend on various factors in different implementations of this description. Examples of such factors may include, but are not limited to the technology used to implement the storage media of storage system 815 and whether the computer-storage media are characterized as primary or secondary storage.

For example, if the computer-storage media are implemented as semiconductor-based memory, software may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be noted that many elements of system 800 may be included in a system-on-a-chip (SoC) device. These elements may include, but are not limited to, the processor 805, communications interface 835, audio interface 840, video interface 845, and storage system 815.

Communications interface 835 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 820, which informs applications and APIs of communications events when necessary.

In various implementations, data or programming instructions utilized by system 800 may be stored on the computing device. However, data or programming instructions may also be stored on any number of remote storage platforms that may be accessed by the device over communication networks via the communications interface 835. Such remote storage providers might include, for example, a server computer in a distributed computing network, such as the Internet. They may also include "cloud storage providers" whose data and functionality are accessible to applications through OS functions or APIs.

User interface 850 may include input devices such as a mouse 855, track pad, keyboard 856, microphone 857, a touch device 859 for receiving a touch gesture from a user, a motion input device 858 for detecting non-touch gestures and other motions by a user, and other types of input devices and their associated processing elements capable of receiving user input.

Output devices such as display screens 851, speakers 852, haptic devices for tactile feedback, and other types of output devices may be included in user interface 850. In certain cases, the input and output devices may be combined in a single device, such as a touchscreen display which both depicts images and receives touch gesture input from the user. Visual output may be depicted on the display 851 in myriad ways, presenting graphical user interface elements, text, images, video, notifications, virtual buttons, virtual keyboards, or any other type of information capable of being depicted in visual form. Other kinds of user interface are possible. User interface 850 may also include associated user interface software executed by the OS 820 in support of the various user input and output devices. Such software assists the OS in communicating user interface hardware events to application programs 810 and APIs 811 using defined mechanisms.

It should be understood that computing system 800 is generally intended to represent a computing system with which software is deployed and executed in order receive and interpret user input for establishing weight factor values for a tri-variable weight function. However, computing system 800 may also represent any computing system on which software may be staged and from where software may be distributed, transported, downloaded, or otherwise provided to yet another computing system for deployment and execution, or yet additional distribution.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A method for establishing weight factors for a tri-variable weighting function, the method comprising:

displaying a target-input interface element on a display, the target-input interface element allowing a user to change a target by interacting with the target-input interface element;

displaying a triangular figure within a graphical user interface on the display, a first side of the triangular figure representing a first range of a first factor, a second side of the triangular figure representing a second range of a second factor, and a third side of the triangular figure representing a third range of a third factor, and a vertex of the triangular figure representing a lowest value of one factor and a highest value of another factor;

receiving an indication, from the graphical user interface, of a selected position on a side or within the field of the triangular figure;

determining, from the selected position with respect to three vertices of the triangular figure, a first weight factor, a second weight factor, and a third weight factor of the tri-variable weight function; and displaying an option configured to be reordered in response to the selected position on the display, the target-input interface element, the graphical user interface, and the option being displayed at the same time on the display such that the option is dynamically reordered according to the selected position.

2. The method of claim 1, wherein determining weight factors from the selected position with respect to the three vertices of the triangular figure comprises:

generating a first factor segmental line passing through the selected position and intersecting a first factor altitude line at a right angle, wherein the intersection of the first factor segmental line and the first factor altitude line defines a first factor intersection point; measuring a first factor segment distance from the first factor intersection point to the base or the vertex of the first factor altitude line; and determining the first weight factor from a ratio of the first factor segment distance to the length of the first factor altitude line;

generating a second factor segmental line passing through the selected position and intersecting a second factor altitude line at a right angle, wherein the intersection of the second factor segmental line and the second factor altitude line defines a second factor intersection point; measuring a second factor segment distance from the second factor intersection point to the base or the vertex of the second factor altitude line; and determining the second weight factor from a ratio of the second factor segment distance to the length of the second factor altitude line; and generating a third factor segmental line passing through the selected position and intersecting a third factor altitude line at a right angle, wherein the intersection of the third factor segmental line and the third factor altitude line defines a third factor intersection point; measuring a third factor segment distance from the third factor intersection point to the base or the vertex of the third factor altitude line; and determining the third weight factor from a ratio of the third factor segment distance to the length of the third factor altitude line.

3. The method of claim 1, further comprising:

prior to displaying the triangular figure, receiving, from an application having a tri-variable weight function, a request comprising a first definition of the first factor and the first range, a second definition of the second factor and the second range, and a third definition of the third factor and the third range; and sending the first weight factor, the second weight factor, and the third weight factor to the application.

4. The method of claim 1, further comprising:

rendering at least one range demarcation line on the graphical user interface, wherein the at least one range demarcation line is perpendicular to an altitude line of the triangular figure.

5. The method of claim 4, further comprising rendering a range label associated with the at least one demarcation line.

6. The method of claim 1, further comprising:

displaying a feedback interface element indicating values of the first, second, and third weight factors associated with the selected position; and dynamically adjusting the feedback interface element, by a processor, in response to the user indicating a change to the selected position.

7. The method of claim 6, wherein the feedback interface element comprises numeric values of the first, second, and third weight factors.

8. The method of claim 6, wherein the feedback interface element comprises a level indicator showing the relative relationship of the first, second, and third weight factors.

9. A system for establishing weight factors for a tri-variable weighting function, the system comprising:

one or more computer readable media;
a user input device;
a processor; and
program instructions stored on the one or more computer readable storage media that, when executed by the processor, direct the processor to:
display a target-input interface element on a display, the target-input interface element allowing a user of the user input device to change a target by interacting with the target-input interface element;
render a triangular figure within a graphical user interface on the display, a first side of the triangular figure representing a first range of a first factor, a second side of the triangular figure representing a second range of a second factor, and a third side of the triangular figure representing a third range of a third factor, and a vertex of the triangular figure representing a lowest value of one factor and a highest value of another factor;
in response to receiving an indication, from the user input device, of a selected position on a side or within the field of the triangular figure, determine, from the selected position with respect to three vertices of the triangular figure, a first weight factor, a second weight factor, and a third weight factor of the tri-variable weight function; and
display an option configured to be reordered in response to the selected position on the display,
the target-input interface element, the graphical user interface, and the option being displayed at the same time on the display such that the option is dynamically reordered according to the selected position.

10. The system of claim 9, further comprising program instructions that, when executed by the processor, direct the processor to:

prior to displaying the triangular figure, receive from an application having a tri-variable weighting function, a request comprising a first definition of the first factor and the first range, a second definition of the second factor and the second range, and a third definition of the third factor and the third range; and send the first weight factor, the second weight factor, and the third weight factor to the application.

11. The system of claim 9, wherein the determining of the weight factors from the selected position with respect to the three vertices of the triangular figure comprises:

generating segmental lines passing through the selected position and intersecting each altitude line perpendicularly, wherein the intersection of each segmental line with an altitude line defines three factor intersection points;

measuring factor segment distances from each of the three factor intersection points to the base or the vertex of the associated altitude line; and determining the weight factors from the ratio of the factor segment distances to the length of an associated altitude line.

12. The system of claim 9, wherein the user input device is a touchscreen display.

13. The system of claim 9, further comprising program instructions that, when executed by the processor, direct the processor to:

display a feedback interface element indicating values of the first, second, and third weight factors associated with the selected position; and dynamically adjust the feedback interface element, by the processor, in response to the user indicating a change to the selected position on the user input device.

* * * * *